US012619026B2

(12) United States Patent
Chatterjee et al.

(10) Patent No.: US 12,619,026 B2
(45) Date of Patent: May 5, 2026

(54) WAVEGUIDE ESCALATORS FOR A PHOTONICS CHIP

(71) Applicant: GlobalFoundries U.S. Inc., Malta, NY (US)

(72) Inventors: Avijit Chatterjee, Bangalore (IN); Yusheng Bian, Ballston Lake, NY (US); Sujith Chandran, Clifton Park, NY (US); Aneesh Dash, Bangalore (IN); Michal Rakowski, Ballston Lake, NY (US); Riddhi Nandi, Bangalore (IN); Kenneth J. Giewont, Hopewell Junction, NY (US); Theodore Letavic, Putnam Valley, NY (US); Mehrdad Djavid, South Burlington, VT (US); Ravi Prakash Srivastava, Clifton Park, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 305 days.

(21) Appl. No.: 18/390,010

(22) Filed: Dec. 20, 2023

(65) Prior Publication Data

US 2025/0208341 A1     Jun. 26, 2025

(51) Int. Cl.
*G02B 6/12*          (2006.01)
*G02B 6/122*         (2006.01)
*G02B 6/13*          (2006.01)
(52) U.S. Cl.
CPC ......... *G02B 6/12002* (2013.01); *G02B 6/122* (2013.01); *G02B 6/13* (2013.01);
(Continued)

(58) Field of Classification Search
CPC .. G02B 6/12002; G02B 6/122; G02B 6/1228; G02B 6/13; G02B 2006/12061; G02B 2006/12147
See application file for complete search history.

(56) References Cited

U.S. PATENT DOCUMENTS 6,819,853 B2 * 11/2004 Lam ...................... G02B 6/138
                                                          385/14
9,002,156 B2     4/2015 Ellis-Monaghan et al.
(Continued)

OTHER PUBLICATIONS

Wesley D. Sacher et al., "Tri-layer silicon nitride-on-silicon photonic platform for ultra-low-loss crossings and interlayer transitions," Optics Express 25, 30862-30875 (2017).
(Continued)

*Primary Examiner* — Daniel Petkovsek
(74) *Attorney, Agent, or Firm* — Thompson Hine LLP; Anthony Canale

(57)          ABSTRACT

Structures for a waveguide escalator, as well as methods of forming such structures. The structure comprises a first waveguide core on a substrate, a second waveguide core, and a back-end-of-line stack including a third waveguide core disposed between the first waveguide core and the second waveguide core. The third waveguide core comprises a layer stack that includes a first layer, a second layer, and a third layer between the first layer and the second layer. The first layer and the second layer comprise a first dielectric material with a first refractive index, and the third layer comprises a second dielectric material with a second refractive index that is less than the first refractive index.

20 Claims, 15 Drawing Sheets

(52) U.S. Cl.
CPC .............. *G02B 2006/12061* (2013.01); *G02B 2006/12147* (2013.01); *G02B 6/1228* (2013.01)

(56)                    References Cited

U.S. PATENT DOCUMENTS

| | | | | |
|---|---|---|---|---|
| 10,677,991 | B2 * | 6/2020 | Novack | G02B 6/14 |
| 11,536,903 | B1 * | 12/2022 | Letavic | G02B 6/124 |
| 2014/0294341 | A1 * | 10/2014 | Hatori | G02B 6/1228 385/14 |
| 2016/0327742 | A1 * | 11/2016 | Collins | G02B 6/1228 |
| 2023/0314706 | A1 * | 10/2023 | Bian | G02B 6/12002 385/14 |

OTHER PUBLICATIONS

Ryotaro Konoike et al., "SiN/Si double-layer platform for ultralow-crosstalk multiport optical switches," Optics Express 27, 21130-21141 (2019).

Ningfeng Bai et al., "Tri-layer gradient and polarization-selective vertical couplers for interlayer transition," Optics Express 28, 23048-23059 (2020).

K. Giewont et al., "300-mm Monolithic Silicon Photonics Foundry Technology," in IEEE Journal of Selected Topics in Quantum Electronics, vol. 25, No. 5, pp. 1-11, Sep. - Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

Y. Bian et al., "3D Integrated Laser Attach Technology on a 300-mm Monolithic CMOS Silicon Photonics Platform," in IEEE Journal of Selected Topics in Quantum Electronics, vol. 29, No. 3: Photon. Elec. Co-Inte. and Adv. Trans. Print., pp. 1-19, May-Jun. 2023, Art No. 8200519, doi: 10.1109/JSTQE.2023.3238290.

D. D. John et al., "Multilayer Platform for Ultra-Low-Loss Waveguide Applications," in IEEE Photonics Technology Letters, vol. 24, No. 11, pp. 876-878, Jun. 1, 2012, doi: 10.1109/LPT.2012.2189762.

C. G. H. Roeloffzen et al., "Low-Loss Si3N4 TriPleX Optical Waveguides: Technology and Applications Overview," in IEEE Journal of Selected Topics in Quantum Electronics, vol. 24, No. 4, pp. 1-21, Jul.-Aug. 2018, Art No. 4400321, doi: 10.1109/JSTQE. 2018.2793945.

Kuanping Shang et al., "Low-loss compact multilayer silicon nitride platform for 3D photonic integrated circuits," Optics Express 23, 21334-21342 (2015).

Niharika Kohli et al., "Efficient TE/TM spot-size converter for broadband coupling to single mode fibers," OSA Continuum 2, 2428-2438 (2019).

Kim, S., Westly, D.A., Roxworthy, B.J. et al. "Photonic waveguide to free-space Gaussian beam extreme mode converter." Light Science & Applications 7, 72 (2018). https://doi.org/10.1038/s41377-018-0073-2.

* cited by examiner

WAVEGUIDE ESCALATORS FOR A PHOTONICS CHIP

BACKGROUND

The disclosure relates to photonics chips and, more specifically, to structures for a waveguide escalator, as well as methods of forming such structures.

Photonics chips are used in many applications and systems including, but not limited to, data communication systems and data computation systems. A photonics chip includes a photonic integrated circuit comprised of photonic components, such as modulators, polarizers, and optical couplers, that are used to manipulate light received from a light source, such as an optical fiber or a laser.

A waveguide crossing array may include waveguide core crossings that are arranged on a photonics chip. For example, the waveguide crossing array may include waveguide cores in a lower level, and waveguide cores in an upper level that are routed over and across the waveguide cores in the lower level. Direct crossings of waveguide cores may result in adverse consequences, such as high insertion loss and crosstalk, due to strong light scattering induced by the close local proximity of the waveguide cores in the upper and lower levels. Conventional waveguide crossings are unable to avoid the occurrence of these negative consequences.

Improved structures for a waveguide escalator, as well as methods of forming such structures, are needed.

SUMMARY

In an embodiment of the invention, a structure comprises a first waveguide core on a substrate, a second waveguide core, and a back-end-of-line stack including a third waveguide core disposed between the first waveguide core and the second waveguide core. The third waveguide core comprises a layer stack that includes a first layer, a second layer, and a third layer between the first layer and the second layer. The first layer and the second layer comprise a first dielectric material with a first refractive index, and the third layer comprises a second dielectric material with a second refractive index that is less than the first refractive index.

In an embodiment of the invention, a method comprises forming a first waveguide core on a substrate, forming a second waveguide core, and forming a back-end-of-line stack that includes a third waveguide core disposed between the first waveguide core and the second waveguide core. The third waveguide core comprises a layer stack that includes a first layer, a second layer, and a third layer between the first layer and the second layer. The first layer and the second layer comprise a first dielectric material with a first refractive index, and the third layer comprises a second dielectric material with a second refractive index that is less than the first refractive index.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
FIG. 1 is a cross-sectional view of a structure at an initial fabrication stage of a processing method in accordance with embodiments of the invention.
Figure 1:
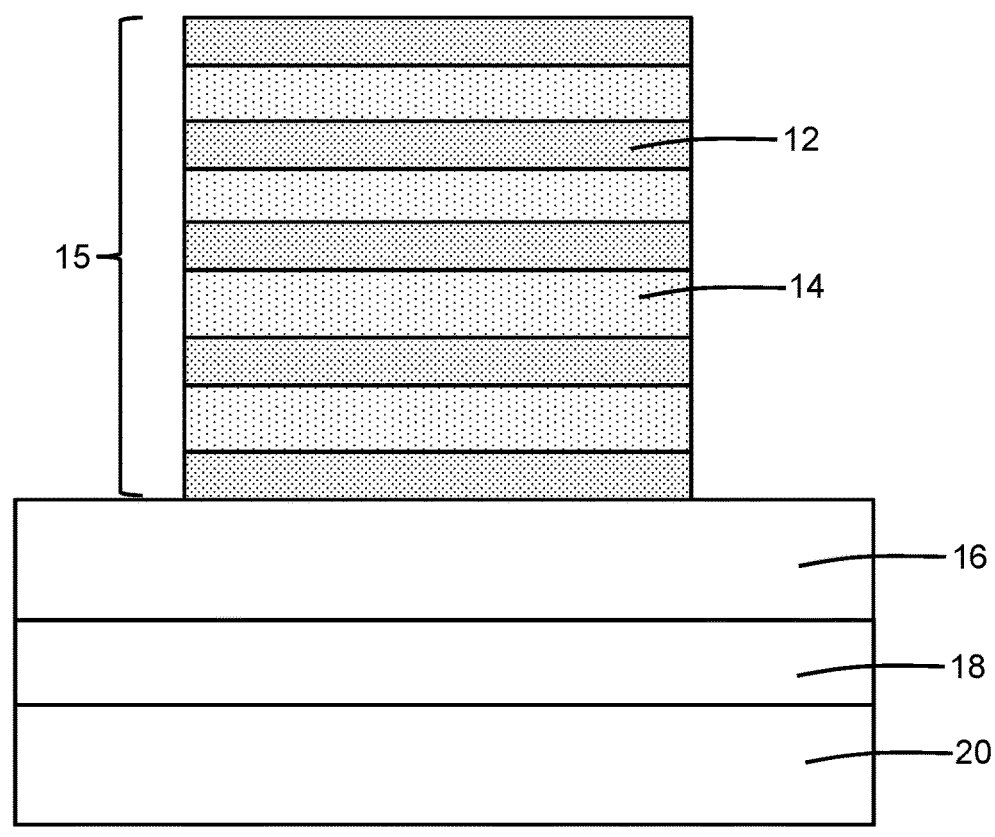

With reference to FIG. 1 and in accordance with embodiments of the invention, a structure 10 for a waveguide core includes layers 12 and layers 14 that alternative with the layers 12 in a heterogenous layer stack 15. Each layer 14 may be disposed between an adjacent pair of the layers 12. The heterogenous layer stack 15 is disposed on, and over, a dielectric layer 16. The layers 12, 14 and the dielectric layer 16 are disposed on, and over, a dielectric layer 18 and a semiconductor substrate 20. The dielectric layer 18 is disposed between the dielectric layer 16 and the semiconductor substrate 20. One of the layers 12 may constitute a bottommost layer of the heterogenous layer stack 15 and one of the layers 12 may constitute a topmost layer of the heterogenous layer stack 15. The layer 12 at the bottom of the heterogenous layer stack 15 may adjoin the dielectric layer 16. In an embodiment, the heterogenous layer stack 15 may include multiple layers 12 and multiple layers 14 that alternate with the layers 12. In an alternative embodiment, the heterogenous layer stack 15 may include as few as a pair of the layers 12 and one of the layers 14 disposed between the pair of the layers 12.

In an embodiment, the dielectric layer 16 may be comprised of a dielectric material, such as silicon dioxide. In an embodiment, the dielectric layer 18 may be comprised of a dielectric material, such as silicon dioxide, and the semiconductor substrate 20 may be comprised of a semiconductor material, such as single-crystal silicon. In an embodiment, the dielectric layer 18 may be a buried oxide layer of a silicon-on-insulator substrate.

The layers 12 and the layers 14 may be comprised of interlayer dielectric materials that are found in a back-end-of-line stack 17. The dielectric material of the layers 12 may have a different composition and/or refractive index than the dielectric material of the layers 14. In an embodiment, the layers 12 may be comprised of a dielectric material that has a refractive index that is greater than the refractive index of the layers 14. In an embodiment, the layers 12 may be comprised of a dielectric material that has a refractive index that is greater than the refractive index of the dielectric layer 16. The dielectric layer 16 may function as a low-index cladding for at least the layers 12 in the heterogenous layer stack 15. In an embodiment, the layers 12 may be comprised of a dielectric material that has a refractive index that is greater than the refractive index of the layers 14 and the refractive index of the dielectric layer 16. In an embodiment, the refractive index of the layers 14 may be equal to the refractive index of the dielectric layer 16. In an embodiment, the refractive index of the layers 14 may differ from the refractive index of the dielectric layer 16.

In an embodiment, the layers 12 may be comprised of a dielectric material, such as nitrogen-doped silicon carbide or nitrogen-doped hydrogenated silicon carbide. In an embodiment, the layers 12 may be comprised of silicon nitride. In an embodiment, the layers 14 may be comprised of a low-k dielectric material, such as carbon-doped silicon oxide (SiCOH). In an embodiment, the layers 14 may be comprised of a dielectric material, such as silicon dioxide, tetraethylorthosilicate silicon dioxide, or fluorinated-tetraethylorthosilicate silicon dioxide. In an embodiment, the dielectric layer 16 may be comprised of a dielectric material, such as silicon dioxide, tetraethylorthosilicate silicon dioxide, fluorinated-tetraethylorthosilicate silicon dioxide, or a low-k dielectric material like carbon-doped silicon oxide (SiCOH). In an embodiment, the layers 14 may be comprised of the same dielectric material as the dielectric layer 16. In an embodiment, the layers 14 may be comprised of a different dielectric material from the dielectric layer 16.

The heterogenous layer stack 15 including the layers 12, 14 may be formed by patterning the interlayer dielectric layers of the back-end-of-line stack 17 with lithography and etching processes. In an embodiment, the layers 12, 14 may have vertical sidewalls such that the heterogenous layer stack 15 has a cross-sectional area that is constant with increasing distance from the dielectric layer 16. In an alternative embodiment, the layers 12, 14 may have angled sidewalls such that the heterogenous layer stack 15 has a cross-sectional area that decreases with increasing distance from the dielectric layer 16. In an embodiment, the layers 12 and the layers 14 may have equal thicknesses. In an embodiment, the layers 12 and the layers 14 may have unequal thicknesses. In an alternative embodiment, the heterogenous layer stack 15 may include as few as a pair of layers 12 and a layer 14 disposed between the layers 12 in the pair.

Figure 2:
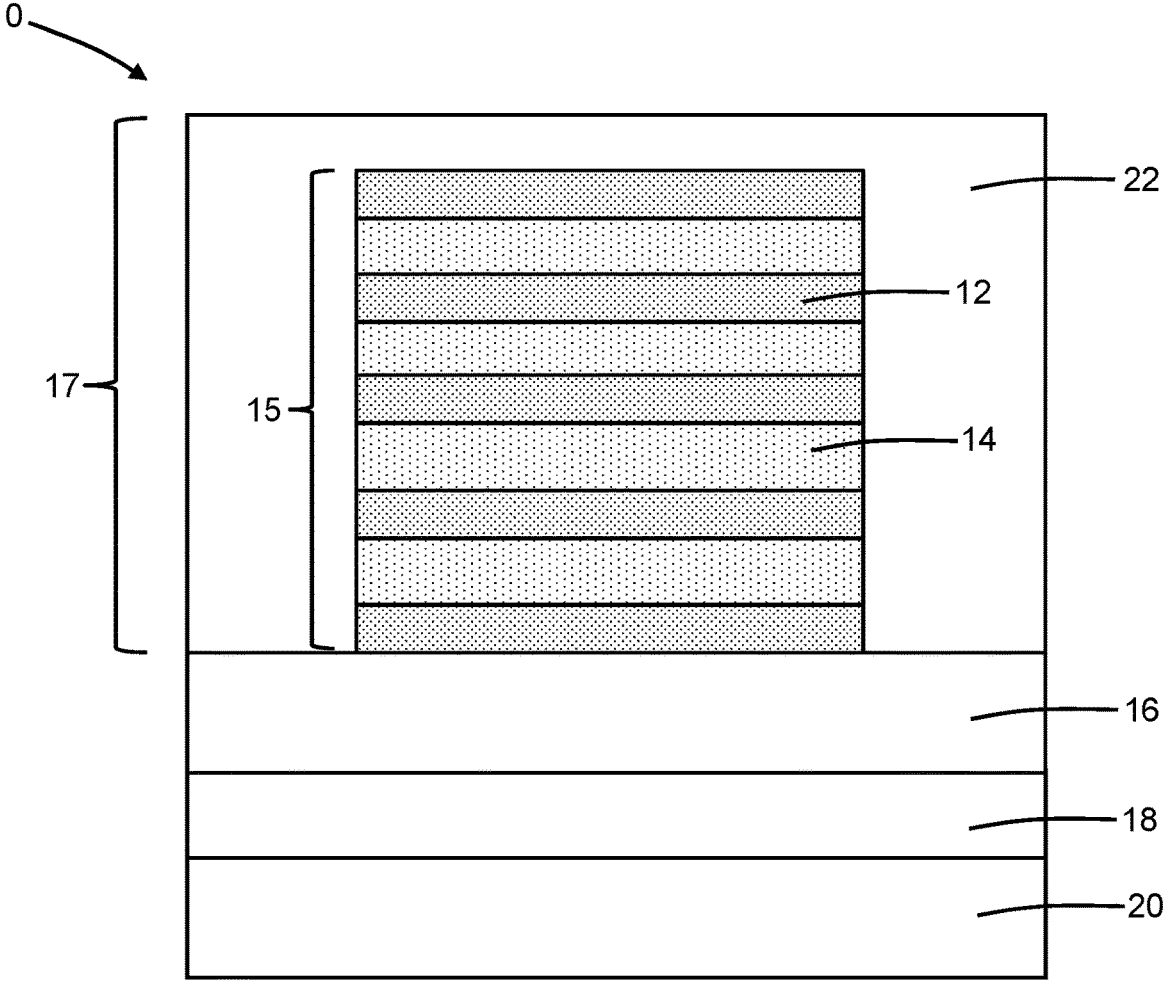
FIG. 2 is a cross-sectional view of the structure at a fabrication stage of the processing method subsequent to FIG. 1.

With reference to FIG. 2 in which like reference numerals refer to like features in FIGS. 1, 1A and at a subsequent fabrication stage, the back-end-of-line stack 17 may include a dielectric layer 22 that is formed over the layers 12, 14 in the heterogenous layer stack 15 and the surface of the dielectric layer 16 surrounding the heterogenous layer stack 15. The heterogenous layer stack 15 may be embedded inside the dielectric layer 22, which may be deposited and planarized following deposition. The dielectric layer 22 may function as low-index cladding for the heterogenous layer stack 15 and may cooperate with low-index cladding of the dielectric layer 16 to surround the heterogenous layer stack 15 with lower index material. In an embodiment, the dielectric layer 22 may be comprised of a dielectric material, such as silicon dioxide, tetraethylorthosilicate silicon dioxide, fluorinated-tetraethylorthosilicate silicon dioxide, or a low-k dielectric material like carbon-doped silicon oxide (SiCOH).

In an embodiment, the dielectric material of the dielectric layer 22 may have a refractive index that differs from the refractive index of the dielectric material of the dielectric layer 16. In an embodiment, the dielectric material of the dielectric layer 22 may have a composition that differs from the composition of the dielectric material of the dielectric layer 16. In an embodiment, the dielectric material of the dielectric layer 22 may have a composition that differs from the composition of the dielectric material of the dielectric layer 16 and a refractive index that differs from the refractive index of the dielectric material of the dielectric layer 16.

In an embodiment, the dielectric material of the dielectric layer 22 may have a refractive index that is the same as the refractive index of the dielectric material of the dielectric layer 16. In an alternative embodiment, the refractive index of the dielectric layer 22 may be equal to the refractive index of the dielectric layer 16. In an alternative embodiment, the dielectric layer 22 may be comprised of the same dielectric material as the dielectric layer 16. In an alternative embodiment, the refractive index of the dielectric layer 22 may be equal to the refractive index of the dielectric layer 16 and the dielectric layer 22 may be comprised of the same dielectric material as the dielectric layer 16.

In an embodiment, the dielectric material of the layers 12 may have a refractive index that is greater than the refractive index of the dielectric material of the dielectric layer 22. In an embodiment, the dielectric material of the layers 12 may have a composition that differs from the composition of the dielectric material of the dielectric layer 22. In an embodiment, the dielectric material of the layers 12 may have a composition that differs from the composition of the dielectric material of the dielectric layer 22 and a refractive index that is greater than the refractive index of the dielectric material of the dielectric layer 22.

In an embodiment, the dielectric material of the layers 14 may have a different composition and/or refractive index from the dielectric material of the dielectric layer 22. In an embodiment, the dielectric material of the layers 14 may have a composition that differs from the composition of the dielectric material of the dielectric layer 22. In an embodiment, the refractive index of the layers 14 may differ from the refractive index of the dielectric layer 22. In an embodiment, the dielectric material of the layers 14 may have a composition that differs from the composition of the dielectric material of the dielectric layer 22 and a refractive index that differs from the refractive index of the dielectric material of the dielectric layer 22.

In an alternative embodiment, the dielectric material of the layers 14 may have the same composition and/or refractive index as the dielectric material of the dielectric layer 22. In an alternative embodiment, the refractive index of the layers 14 may be equal to the refractive index of the dielectric layer 22. In an alternative embodiment, the layers 14 may be comprised of the same dielectric material as the dielectric layer 22. In an alternative embodiment, the refractive index of the layers 14 may be equal to the refractive index of the dielectric layer 22 and the layers 14 may be comprised of the same dielectric material as the dielectric layer 22.

The waveguide core embodied in the heterogenous layer stack 15 may exhibit single-mode behavior over a wide range of width dimensions at wavelengths of interest in photonics applications. In an embodiment, the waveguide core embodied in the heterogenous layer stack 15 may be straight or linear. In an alternative embodiment, the waveguide core embodied in the heterogenous layer stack 15 may be curved into a bend, or include a bend, instead of being straight or linear. In an alternative embodiment, all or a portion of the waveguide core embodied in the heterogenous layer stack 15 may be tapered, instead of being non-tapered. In alternative embodiments, the heterogenous layer stack 15 may be integrated into a different type of passive photonics component, such as a multi-mode interferometer coupler or a directional coupler. Photonic components that include the heterogenous layer stack 15 may be monolithically integrated with other passive photonic components, active photonic components, and/or complementary-metal-oxide-semiconductor components such as field-effect transistors.

Figure 3:
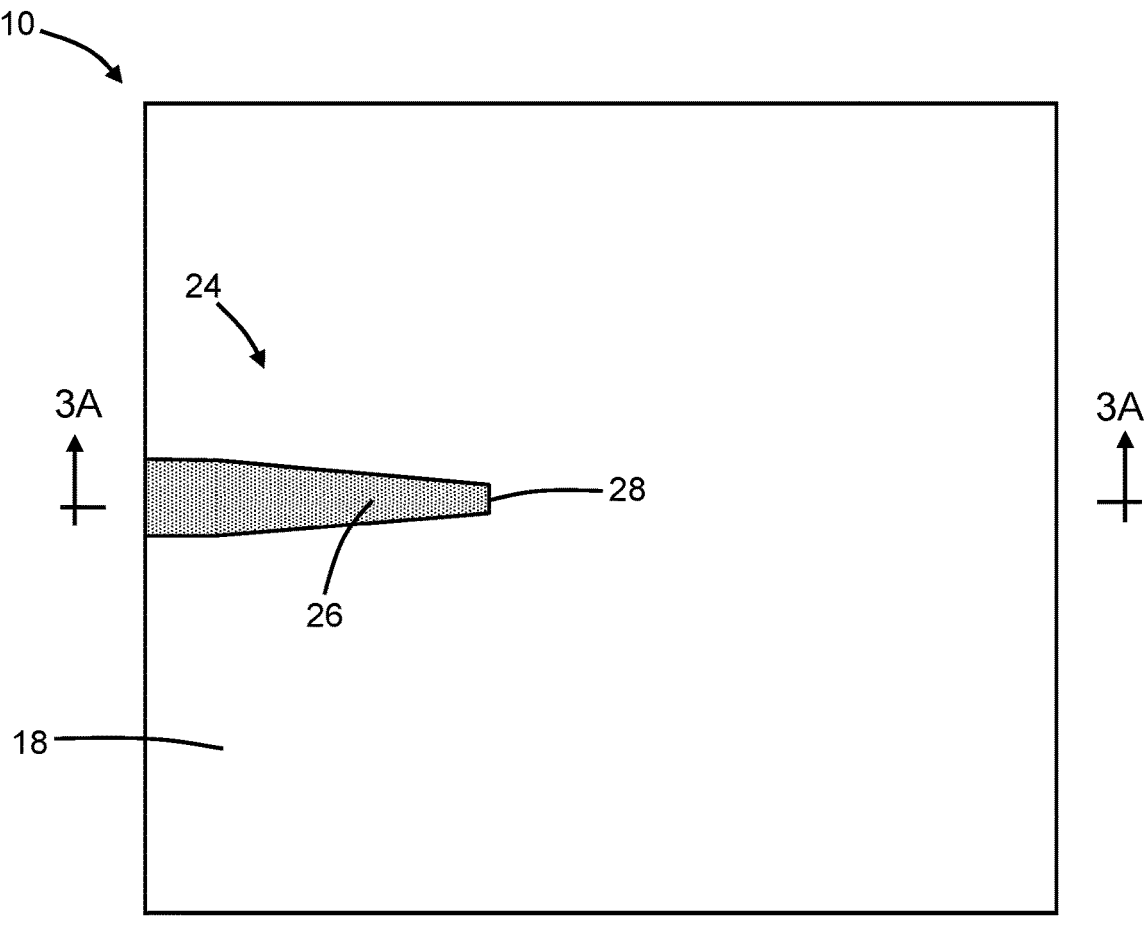
FIG. 3 is a top view of a structure at an initial fabrication stage of a processing method in accordance with embodiments of the invention.
Figure 3A:
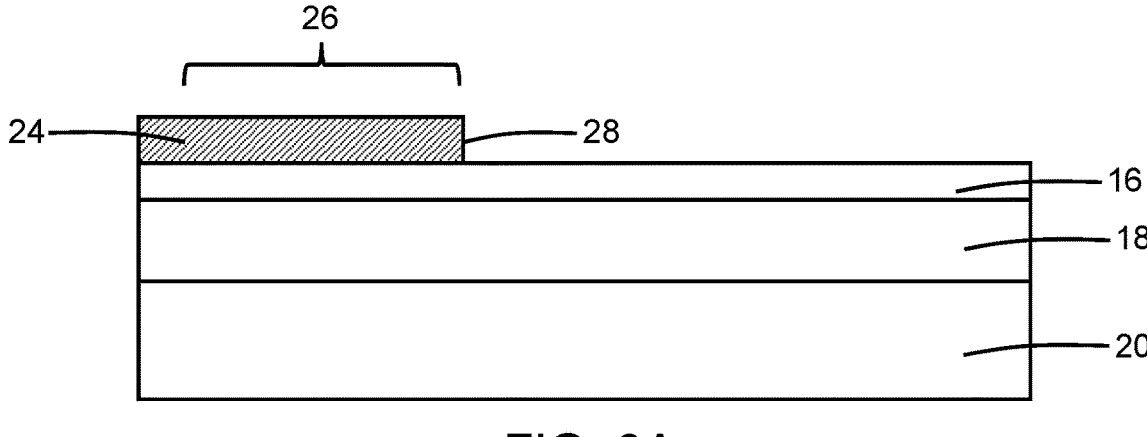
FIG. 3A is a cross-sectional view taken generally along line 3A-3A in FIG. 3.

With reference to FIGS. 3, 3A and in accordance with alternative embodiments, the structure 10 may integrate the heterogenous layer stack 15 into an escalator for interlevel light transfer between levels at different elevations on a photonics chip. In that regard, the structure 10 may further include a waveguide core 24 that is positioned on, and over, the dielectric layer 18. The waveguide core 24 may be connected to other optical components of a photonic integrated circuit on the photonics chip.

The waveguide core 24 may include a tapered section 26 and an end 28 that terminates the tapered section 26. The width dimension of the tapered section 26 may vary over its length. In an embodiment, the width dimension of the tapered section 26 may increase with increasing distance from the end 28. In an embodiment, the width dimension of the tapered section 26 may linearly increase with increasing distance from the end 28. In an alternative embodiment, the width dimension of the tapered section 26 may change based on a non-linear function, such as a quadratic function, a cubic function, a parabolic function, a sine function, a cosine function, a Bezier function, or an exponential function. In an embodiment, the tapered section 26 may be characterized by a uniform taper angle. In an alternative embodiment, the tapered section 26 may taper in multiple stages each characterized by a different taper angle.

The waveguide core 24 may be formed by patterning a layer of its constituent material with lithography and etching processes. In an embodiment, the waveguide core 24 may be comprised of a material having a refractive index that is greater than the refractive index of silicon dioxide. In an embodiment, the waveguide core 24 may be comprised of a dielectric material, such as silicon nitride. In an alternative embodiment, the waveguide core 24 may be comprised of a different dielectric material, such as silicon oxynitride, aluminum nitride, or aluminum oxide. In an alternative embodiment, the waveguide core 24 may be comprised of a semiconductor material, such as polysilicon or amorphous silicon. In alternative embodiments, other materials, such as a polymer or a III-V compound semiconductor, may be used to form the waveguide core 24.

Figure 4:
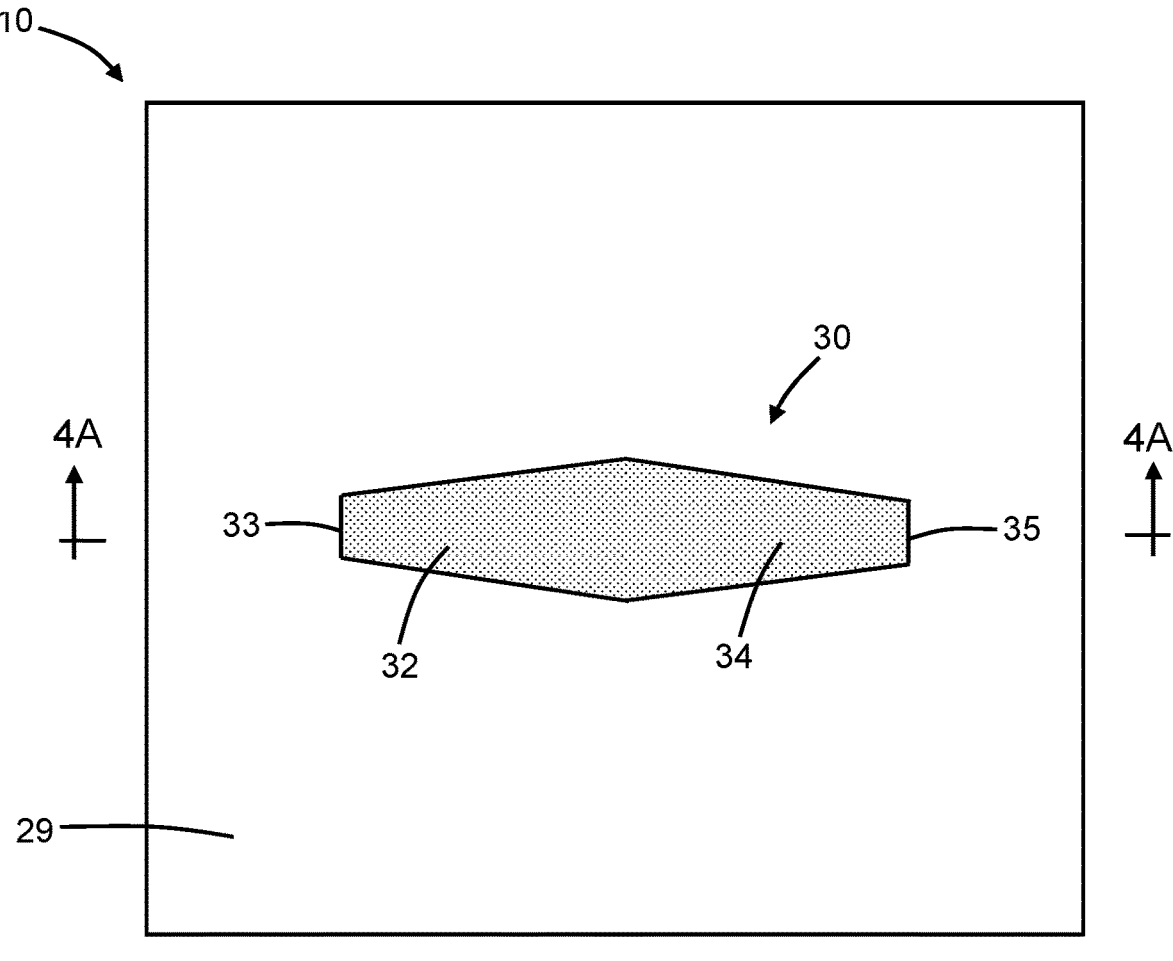
FIG. 4 is a top view of the structure at a fabrication stage of the processing method subsequent to FIGS. 3, 3A.
Figure 4A:
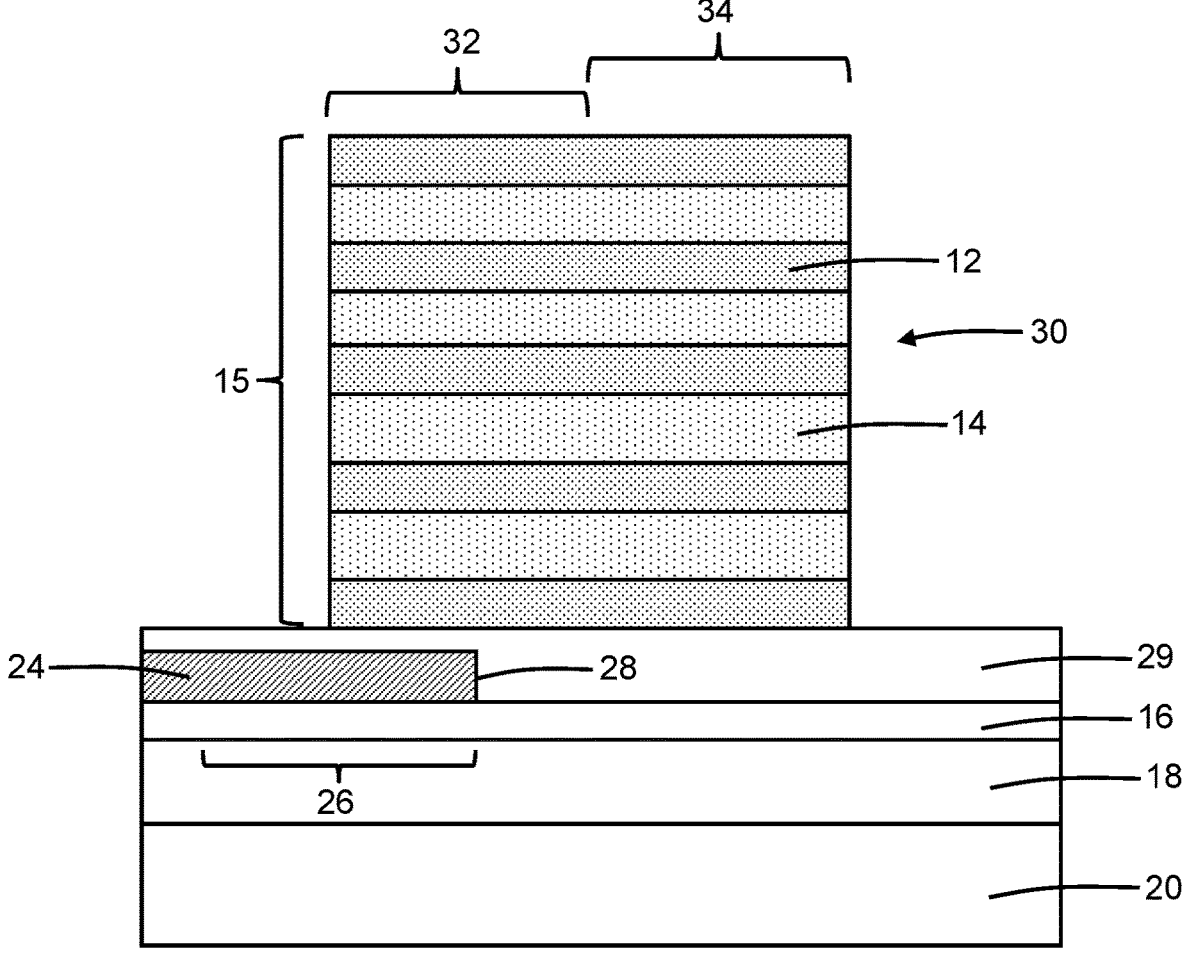
FIG. 4A is a cross-sectional view taken generally along line 4A-4A in FIG. 4.

With reference to FIGS. 4, 4A in which like reference numerals refer to like features in FIGS. 3, 3A and at a subsequent fabrication stage, a dielectric layer 29 comprised of a dielectric material, such as silicon dioxide, may be formed over the waveguide core 24 and planarized. A waveguide core 30 that includes the heterogenous layer stack 15 may be formed on the dielectric layer 29 when the back-end-of-line stack 17 is patterned by lithography and etching processes to form the heterogenous layer stack 15. In an embodiment, the waveguide core 30 may include multiple tapers, such as a tapered section 32 and a tapered section 34. In an embodiment, the tapered section 32 may adjoin the tapered section 34 such that the waveguide core 30 includes back-to-back or consecutive tapers. The tapered section 32 has an end 33 that terminates the waveguide core 30, and the tapered section 34 also has an end 35 that terminates the waveguide core 30. The end 33 is disposed along the length of the waveguide core 30 opposite from the end 35, and the tapered sections 32, 34 are disposed between the end 33 and the end 36.

The waveguide core 30 has a width dimension that varies over its length between the opposite ends 33, 35. In an embodiment, the tapered section 34 may taper in an opposite direction from the tapering of the tapered section 32. In an embodiment, the width dimension of the tapered section 32 may increase with increasing distance from the end 33, and the width dimension of the tapered section 34 may increase with increasing distance from the end 35. In an embodiment, the width dimension of the tapered section 32 and/or the width dimension of the tapered section 34 may linearly increase with increasing distance from the respective ends 33, 35. In an alternative embodiment, the width dimension of the tapered section 32 and/or the width dimension of the tapered section 34 may change based on a non-linear function, such as a quadratic function, a cubic function, a parabolic function, a sine function, a cosine function, a Bezier function, or an exponential function. In an embodiment, the tapered section 32 and/or the tapered section 34 may be characterized by a uniform taper angle. In an alternative embodiment, the tapered section 32 and/or the tapered section 34 may taper in multiple stages each characterized by a different taper angle.

The tapered section 32 of the waveguide core 30 may overlap with the tapered section 26 of the waveguide core 24. In an embodiment, the tapered section 32 may fully overlap with the tapered section 26 of the waveguide core 24. In an embodiment, the tapered section 32 may overlap with a portion of the tapered section 26 of the waveguide core 24. In alternative embodiments, the waveguide core 30 may have a different shape, such as a straight section adjacent to the end 33, a straight section adjacent to the end 35, and the tapered sections 32, 34 may be disposed between the straight sections.

Figure 5:
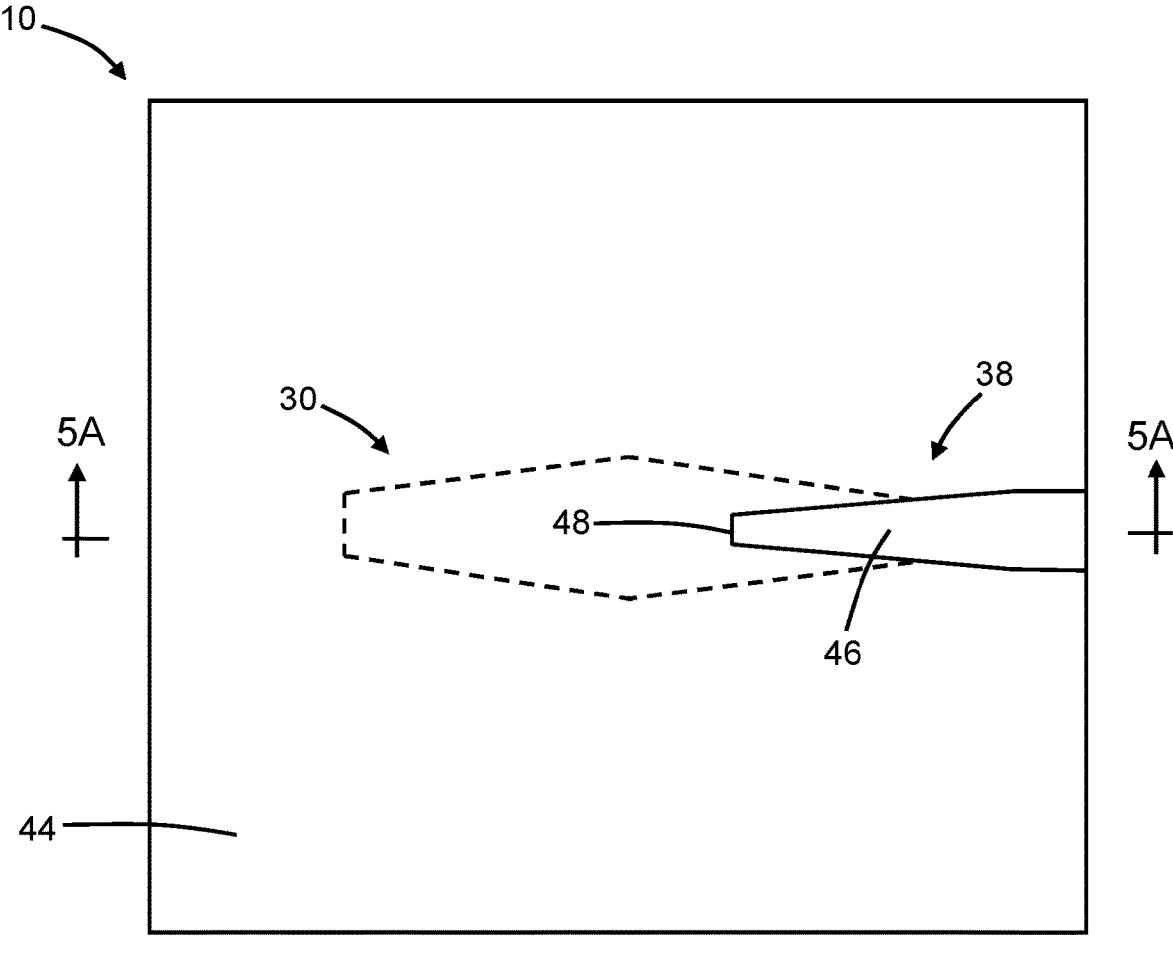
FIG. 5 is a top view of the structure at a fabrication stage of the processing method subsequent to FIGS. 4, 4A and in which overlying layers are omitted for purposes of illustration.
Figure 5A:
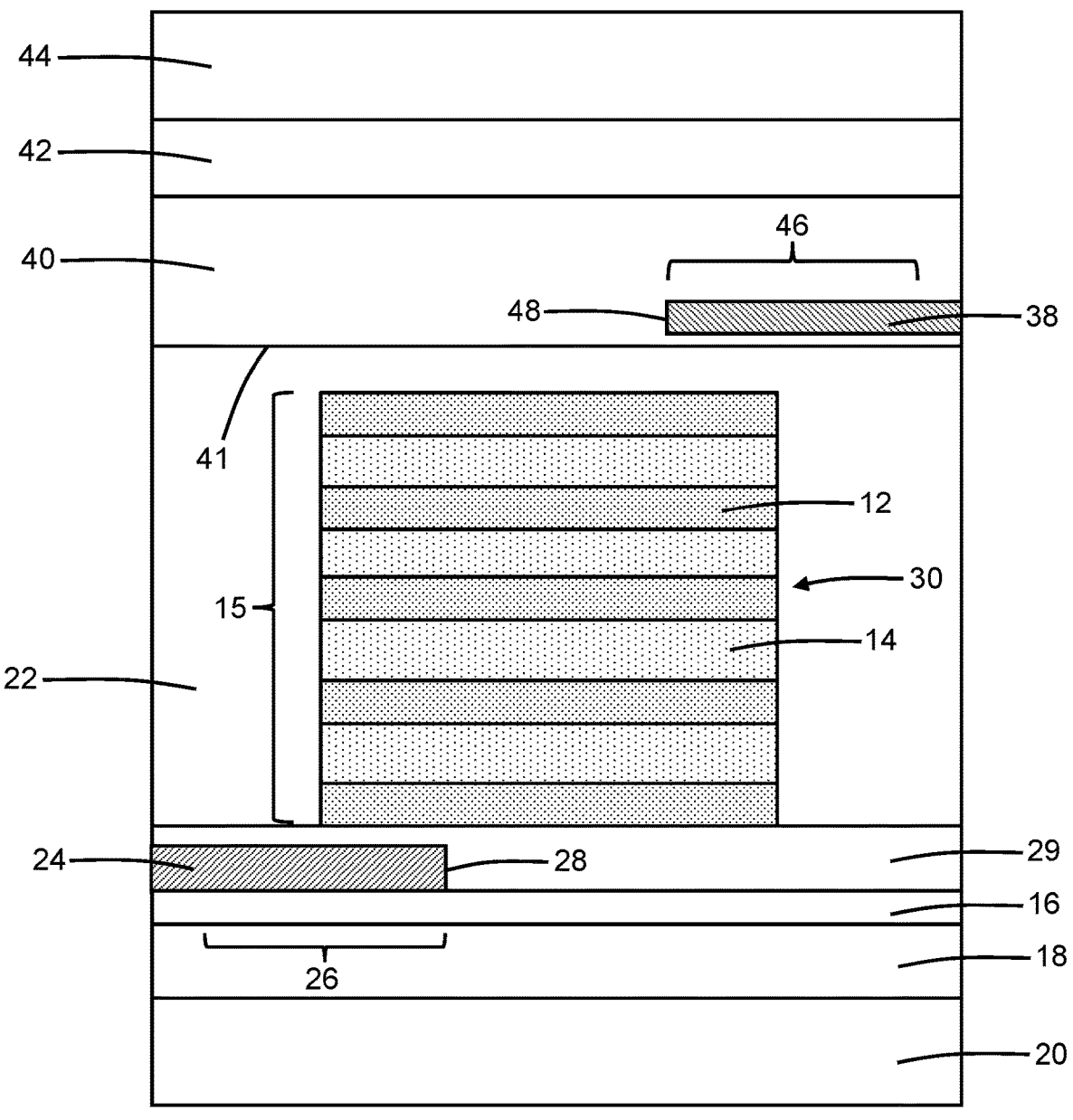
FIG. 5A is a cross-sectional view taken generally along line 5A-5A in FIG. 5.

With reference to FIGS. 5, 5A in which like reference numerals refer to like features in FIGS. 4, 4A and at a subsequent fabrication stage, the dielectric layer 22 may be formed over the waveguide core 30 and dielectric layer 16. A waveguide core 38 may be embedded inside a dielectric layer 40, and the dielectric layer 40 may be joined along a bonding interface 41 to the dielectric layer 22 by dielectric bonding or hybrid bonding. The waveguide core 38 and dielectric layer 40 may be disposed on, and over, a dielectric layer 42 similar or identical to dielectric layer 18 and a semiconductor substrate 44 similar or identical to semiconductor substrate 20. The dielectric layer 40 may be comprised of a dielectric material, such as silicon dioxide.

The waveguide core 38 may include a tapered section 46 and an end 48 that terminates the tapered section 46. The width dimension of the tapered section 46 may vary over its length. In an embodiment, the width dimension of the tapered section 46 may increase with increasing distance from the end 48. In an embodiment, the width dimension of the tapered section 46 may linearly increase with increasing distance from the end 48. In an alternative embodiment, the width dimension of the tapered section 46 may change based on a non-linear function, such as a quadratic function, a cubic function, a parabolic function, a sine function, a cosine function, a Bezier function, or an exponential function. In an embodiment, the tapered section 46 may be characterized by a uniform taper angle. In an alternative embodiment, the tapered section 46 may taper in multiple stages each characterized by a different taper angle.

The waveguide core 30 is disposed in elevation relative to the semiconductor substrate 20 between the waveguide core 24 and the waveguide core 38. The tapered section 46 of the waveguide core 38 may overlap with the underlying tapered section 34 of the waveguide core 30. In an embodiment, the tapered section 46 may fully overlap with the underlying tapered section 34 of the waveguide core 30. In an embodiment, the tapered section 46 may overlap with a portion of the underlying tapered section 34 of the waveguide core 30.

The waveguide core 30 may function as an escalator to enable bidirectional interlevel light transfer between the waveguide core 24 and the waveguide core 38. In particular, the waveguide core 30 may enable bidirectional interlevel light transfer across the bonding interface 41. In use, light propagating in the waveguide core 24 may be transferred upwardly from the tapered section 26 of the waveguide core 24 to the overlying tapered section 32 of the waveguide core 30. The transferred light is then transferred upwardly from the tapered section 34 of the waveguide core 30 to the overlying tapered section 46 of the waveguide core 38. Conversely, light propagating in the waveguide core 38 may be transferred downwardly from the tapered section 46 of the waveguide core 38 to the underlying tapered section 34 of the waveguide core 30, and then transferred downwardly from the tapered section 32 of the waveguide core 30 to the underlying tapered section 26 of the waveguide core 24.

The waveguide core 30 formed by patterning the heterogenous layer stack 15 may be effective to reduce insertion loss for the interlevel transfer of light between the waveguide core 24 and the waveguide core 38. The waveguide core 30 formed by patterning the heterogenous layer stack 15 may permit a reduction in the footprint of the interlevel escalators while promoting efficient light transfer.

Figure 6:
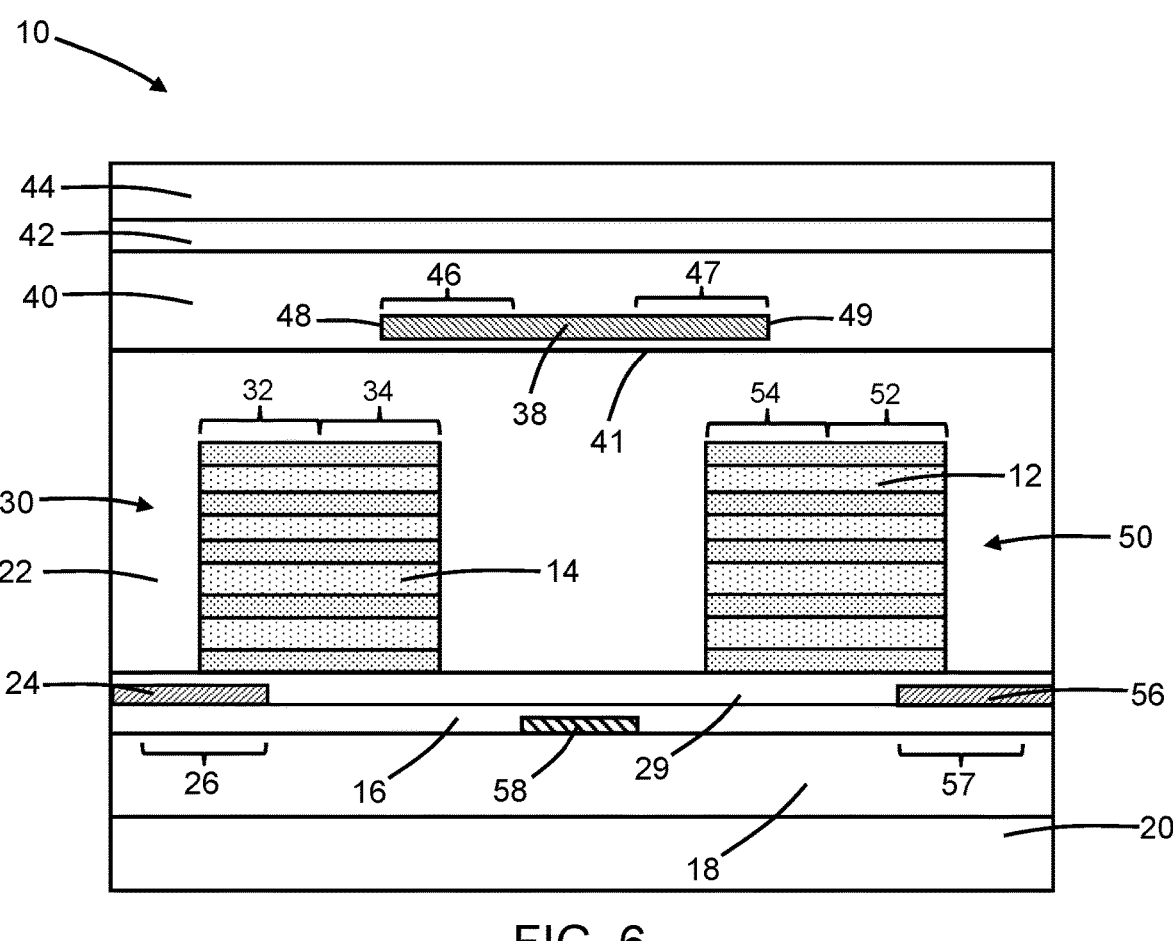
FIG. 6 is a cross-sectional view of a structure in accordance with alternative embodiments of the invention.

With reference to FIG. 6 and in accordance with alternative embodiments, the structure 10 may be utilized in a waveguide crossing that includes a waveguide core 50, which is similar or identical to the waveguide core 30. In that regard, the waveguide core 50 includes the alternating layers 12, 14 of different composition and/or refractive index in a different heterogenous layer stack 15, and the waveguide core 50 is disposed laterally adjacent to the waveguide core 30. The waveguide core 30 and the waveguide core 50 are laterally separated by a gap that is bridged by a section of the waveguide core 38. The waveguide core 38 may include a tapered section 47 similar or identical to the tapered section 46 and an end 49 that terminates the tapered section 47. The end 49 is opposite to the end 48, and the tapered sections 46, 47 may be disposed between the opposite ends 48, 49 of the waveguide core 38. The bridging section of the waveguide core 38, which may be non-tapered, connects the tapered section 46 to the tapered section 47.

The waveguide core 50 may include a tapered section 52 that is similar or identical to the tapered section 32 of the waveguide core 30 and a tapered section 54 that is similar or identical to the tapered section 34 of the waveguide core 30. The tapered section 47 of the waveguide core 38 may overlap with the tapered section 54 of the waveguide core 50. In an embodiment, the tapered section 47 may fully overlap with the underlying tapered section 54 of the waveguide core 50. In an embodiment, the tapered section 47 may overlap with a portion of the underlying tapered section 54 of the waveguide core 50. The waveguide core 50 may be formed during the patterning of the heterogenous layer stack 15 when forming the waveguide core 30. The waveguide core 30 and the waveguide core 50 represent different portions of the patterned heterogenous layer stack 15.

A waveguide core 56, which may be similar or identical to waveguide core 24, is disposed in elevation relative to the semiconductor substrate 20 between the waveguide core 56 and the waveguide core 38. The waveguide core 56 may include a tapered section 57, which may be similar or identical to the tapered section 26 of the waveguide core 24, that is overlapped by the tapered section 52 of the waveguide core 50.

A waveguide core 58 may be disposed in the gap between the waveguide core 30 and the waveguide core 50 at the level, or approximately at the level, of the waveguide core 24 and the waveguide core 56. In an embodiment, the waveguide core 58 may be aligned orthogonal to the waveguide core 24 and the waveguide core 56, and the waveguide core 38 may extend orthogonally across the waveguide core 58. The waveguide core 38 crosses over the waveguide core 58 to enable light transfer in a three-dimensional crossing between the waveguide core 24 and the waveguide core 56. In an embodiment, the waveguide core 58 may be comprised of a semiconductor material, such as single-crystal silicon. In the representative embodiment, the waveguide core 58 may be disposed in elevation relative to the semiconductor substrate 20 below the level of the waveguide core 24 and the waveguide core 56. In an alternative embodiment, the waveguide core 58 may be disposed in elevation at the same level as the waveguide core 24 and the waveguide core 56, and the waveguide core 58 may be formed from the same material as the waveguide cores 24, 56. In an alternative embodiment, the waveguide core 58 may be disposed in elevation above the level of the waveguide core 24 and the waveguide core 56. In an embodiment, the waveguide core 58 may be comprised of a different material than the waveguide cores 24, 56.

In use, light may be bidirectionally transferred between the tapered section 26 of the waveguide core 24 and the tapered section 57 of the waveguide core 56 with the assistance of the features provided by the waveguide core 30 for an elevation change, the waveguide core 38 for lateral transfer at a higher level than the waveguide core 58, and the waveguide core 50 for another elevation change. The waveguide cores 30, 50 embodied in the elevators may assist with minimizing insertion loss during the interlevel light transfer. The three-dimensional crossing embodied in the structure 10 incorporating the waveguide cores 30, 50 used in an array of three-dimensions crossings deployed in, for example, a photonic computing application.

Figure 7:
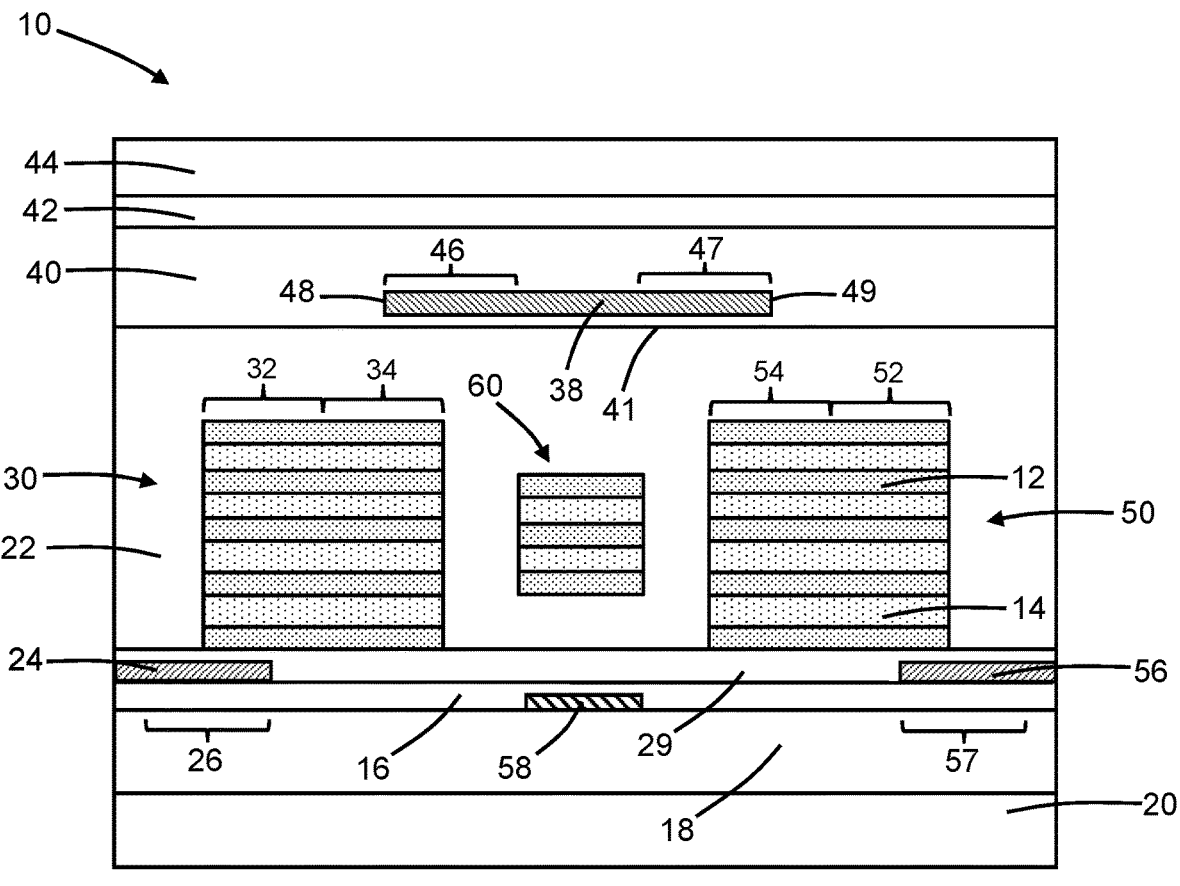
FIG. 7 is a cross-sectional view of a structure in accordance with alternative embodiments of the invention.

With reference to FIG. 7 and in accordance with alternative embodiments, the structure 10 may be modified to add a waveguide core 60 that includes the alternating layers 12, 14 of different composition and/or refractive index in a different heterogenous layer stack 15. In that regard, the waveguide core 60 includes the alternating layers 12, 14 of different composition and/or refractive index, and the waveguide core 60 is laterally disposed in the gap between the waveguide core 30 and the waveguide core 50. The waveguide core 60 is laterally spaced from the waveguide core 30, and the waveguide core 60 is laterally spaced from the waveguide core 50. In an embodiment, the waveguide core 60 may be symmetrically positioned in the gap between the waveguide core 30 and the waveguide core 50. The waveguide core 60 is disposed over the waveguide core 58 and vertically between the waveguide core 38 and the waveguide core 58. The waveguide core 60 may be formed when patterning the back-end-of-line stack to form the heterogenous layer stack 15, to form the waveguide core 30 and waveguide core 50. The waveguide core 30, the waveguide core 50, and the waveguide core 60 each include a discrete patterned heterogenous layer stack 15. In an embodiment, the waveguide core 60 may include fewer of the layers 12 than either the waveguide core 30 or the waveguide core 50.

Figure 8:
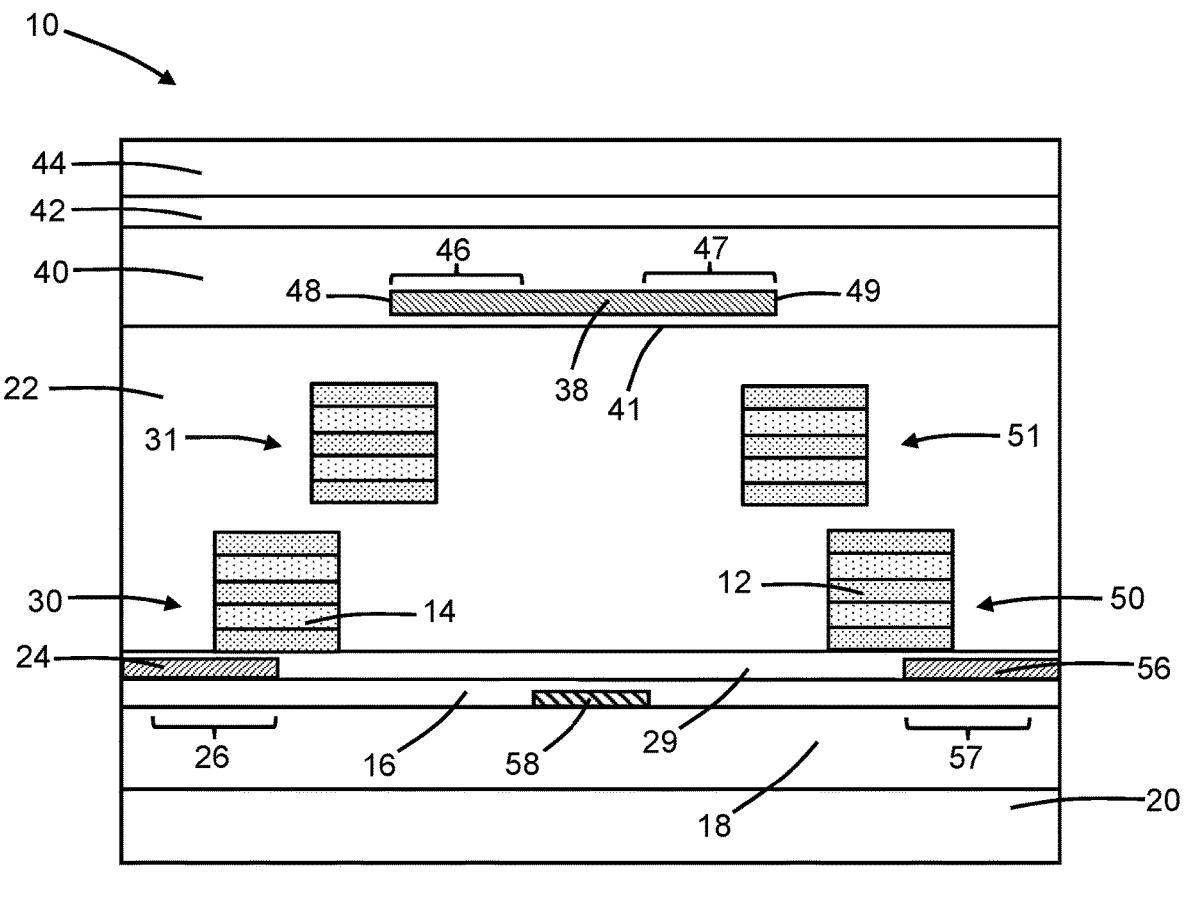
FIG. 8 is a cross-sectional view of a structure in accordance with alternative embodiments of the invention.

With reference to FIG. 8 and in accordance with alternative embodiments, the waveguide core 30 and the waveguide core 50 may include fewer layers 12, 14, an additional waveguide core 31 may be formed that is laterally and vertically offset from the waveguide core 30, and an additional waveguide core 51 may be formed that is laterally and vertically offset from the waveguide core 51. The waveguide core 31 may overlap with a portion of the waveguide core 30, and the tapered section 46 of the waveguide core 38 may overlap with all or a portion of the waveguide core 31. The waveguide core 51 may overlap with a portion of the waveguide core 50, and the tapered section 46 of the waveguide core 38 may overlap with all or a portion of the waveguide core 51.

Each of the waveguide cores 31, 51 includes a unique heterogenous layer stack 15 with at least two of the layers 12 and at least one of the layers 14. In an embodiment, the waveguide core 31 may include the same number of the layers 12 as the waveguide core 30. In an alternative embodiment, the waveguide core 31 may include a different number of the layers 12 than the waveguide core 30. In an embodiment, the waveguide core 51 may include the same number of the layers 12 as the waveguide core 50. In an alternative embodiment, the waveguide core 51 may include a different number of the layers 12 than the waveguide core 50.

Figure 9:
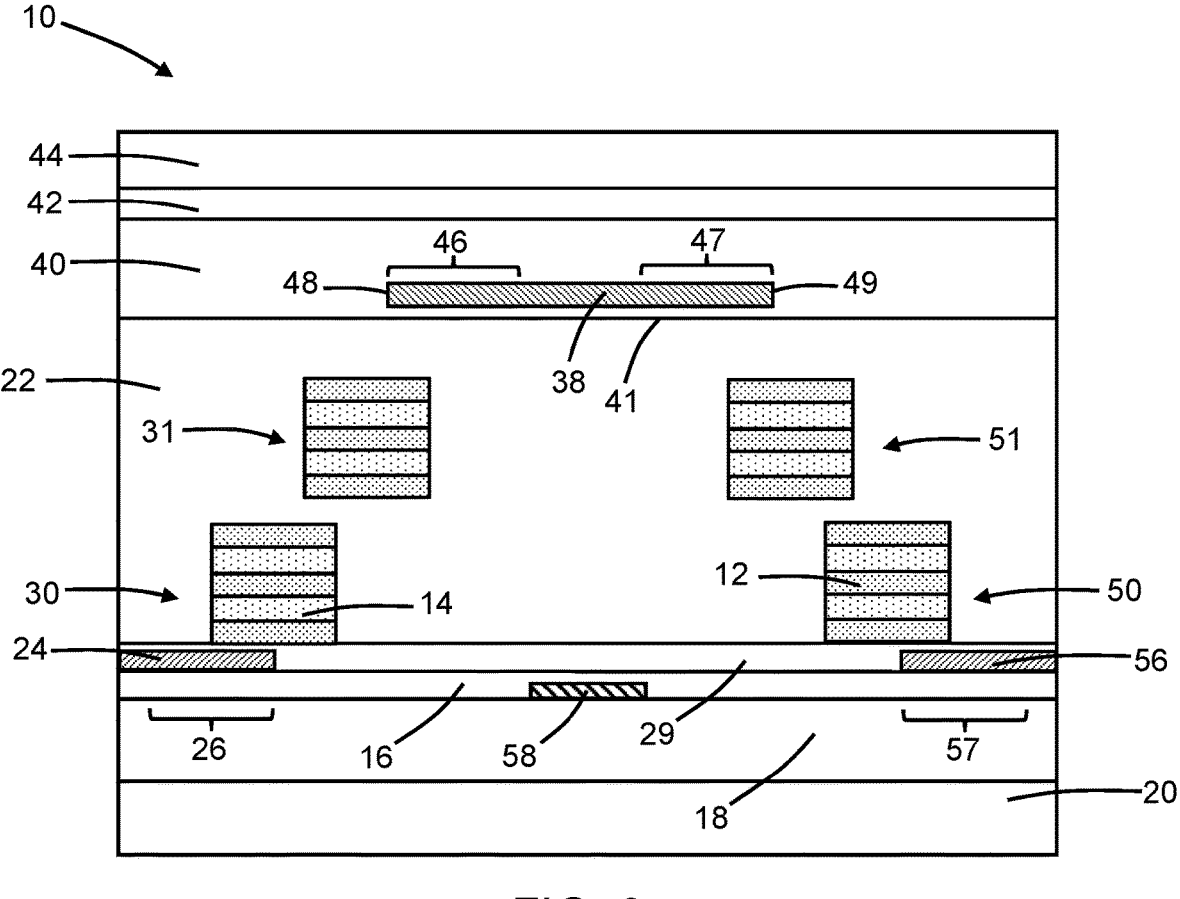
FIG. 9 is a cross-sectional view of a structure in accordance with alternative embodiments of the invention.

With reference to FIG. 9 and in accordance with alternative embodiments, the waveguide core 30 and the waveguide core 50 may be disposed on one side of the bonding interface 41, and the waveguide core 31 and the waveguide core 51 may be disposed on an opposite side of the bonding interface 41. The pair of waveguide cores 30, 31 may facilitate light transfer across the bonding interface 41, and the pair of waveguide cores 50, 51 may also facilitate light transfer across the bonding interface 41.

Figure 10:
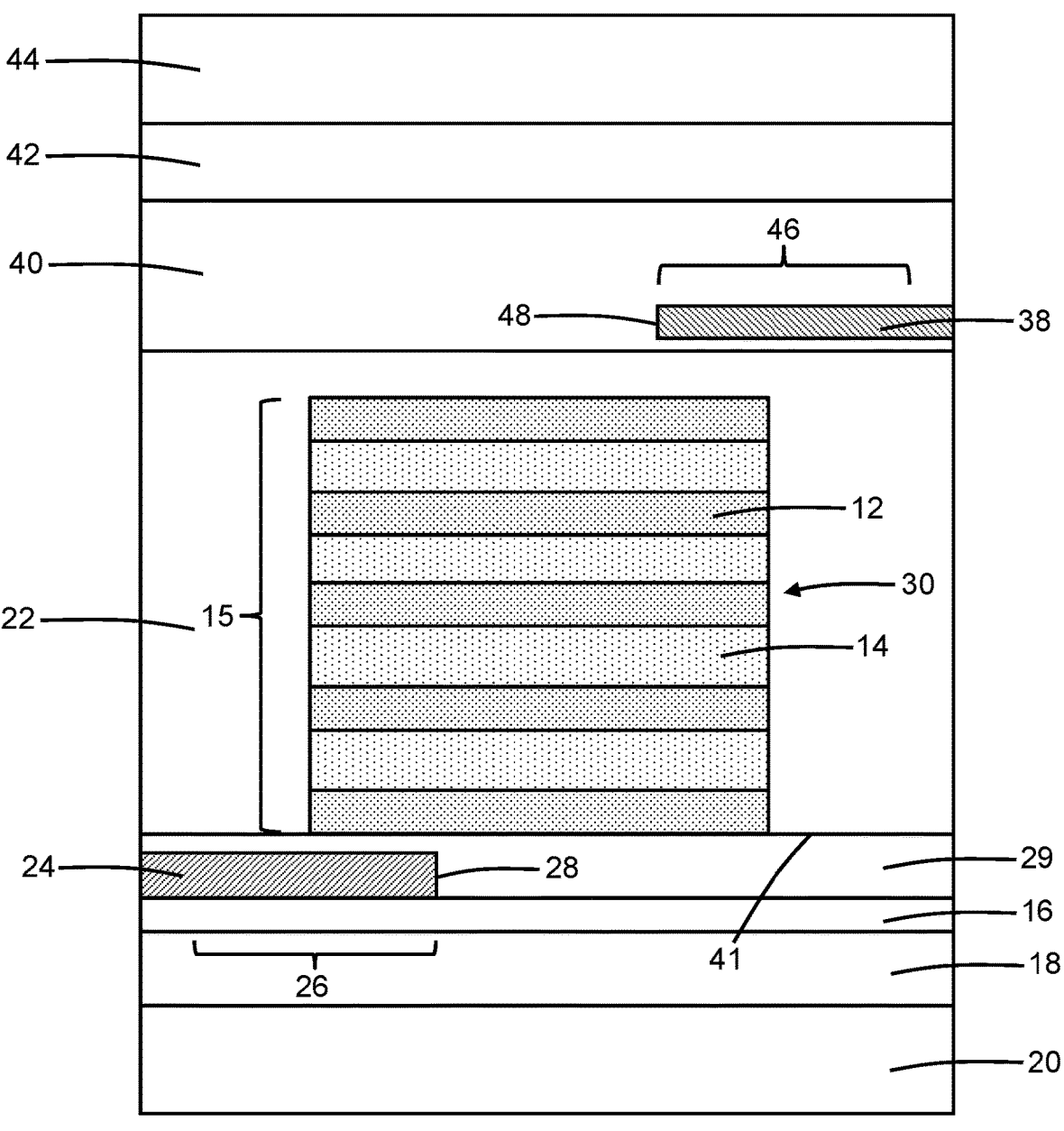
FIG. 10 is a cross-sectional view of a structure in accordance with alternative embodiments of the invention.

With reference to FIG. 10 and in accordance with alternative embodiments, the waveguide core 30, the waveguide core 50, and the dielectric layer 22 may be disposed on the semiconductor substrate 44 along with the waveguide core 38. The dielectric layer 22 may be joined along the bonding interface 41 to the dielectric layer 29 by dielectric bonding or hybrid bonding.

Figure 11:
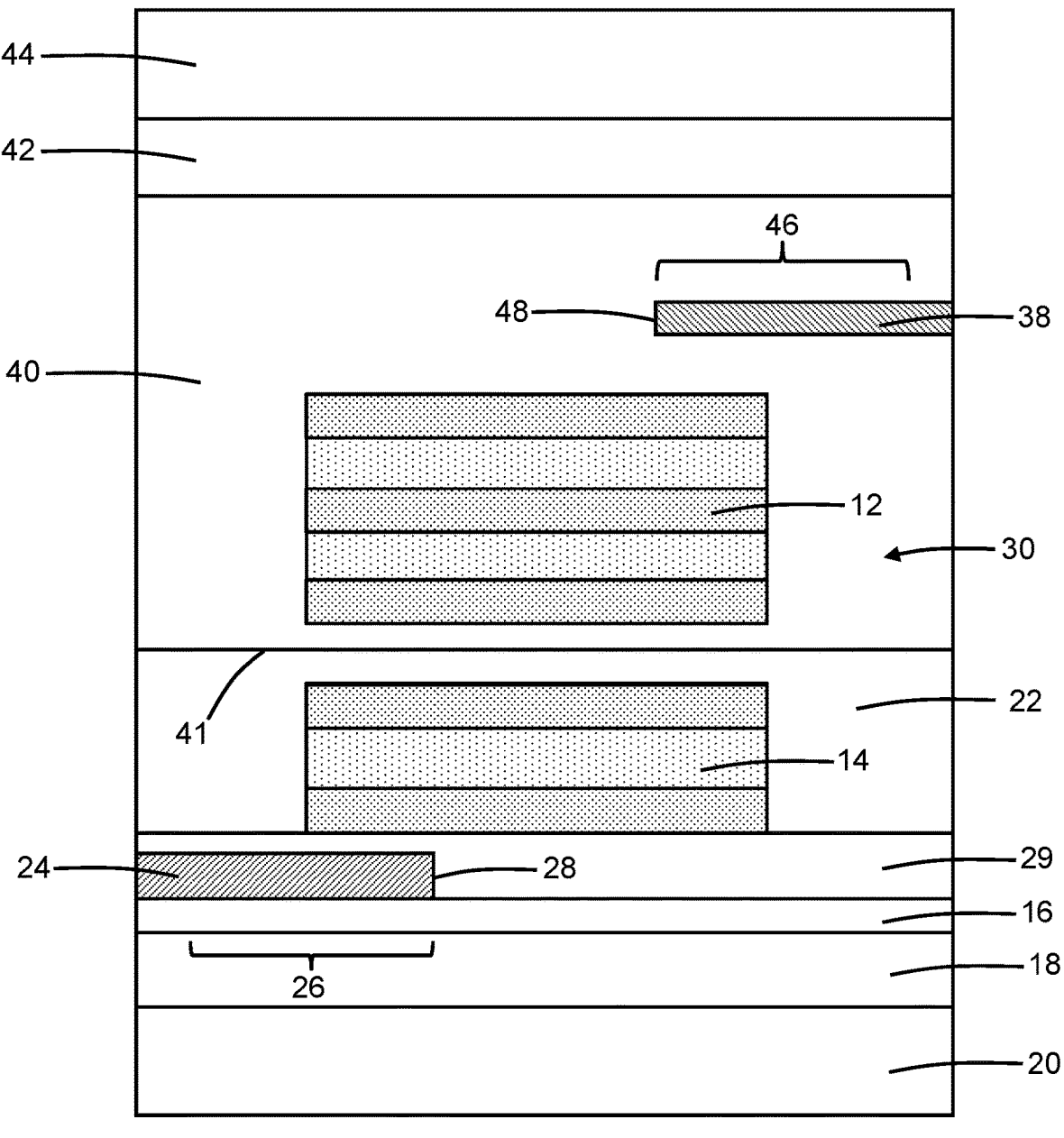
FIG. 11 is a cross-sectional view of a structure in accordance with alternative embodiments of the invention.

With reference to FIG. 11 and in accordance with alternative embodiments, a portion of the waveguide core 30 and a portion of the waveguide core 50 may be disposed on the semiconductor substrate 20, and another portion of the waveguide core 30 and another portion of the waveguide core 50 may be disposed on the semiconductor substrate 44. The dielectric layer 22 may be joined along the bonding interface 41 to the dielectric layer 40 by dielectric bonding or hybrid bonding. The different portions of each of the waveguide cores 30, 50 may overlap across the bonding interface 41.

Figure 12:
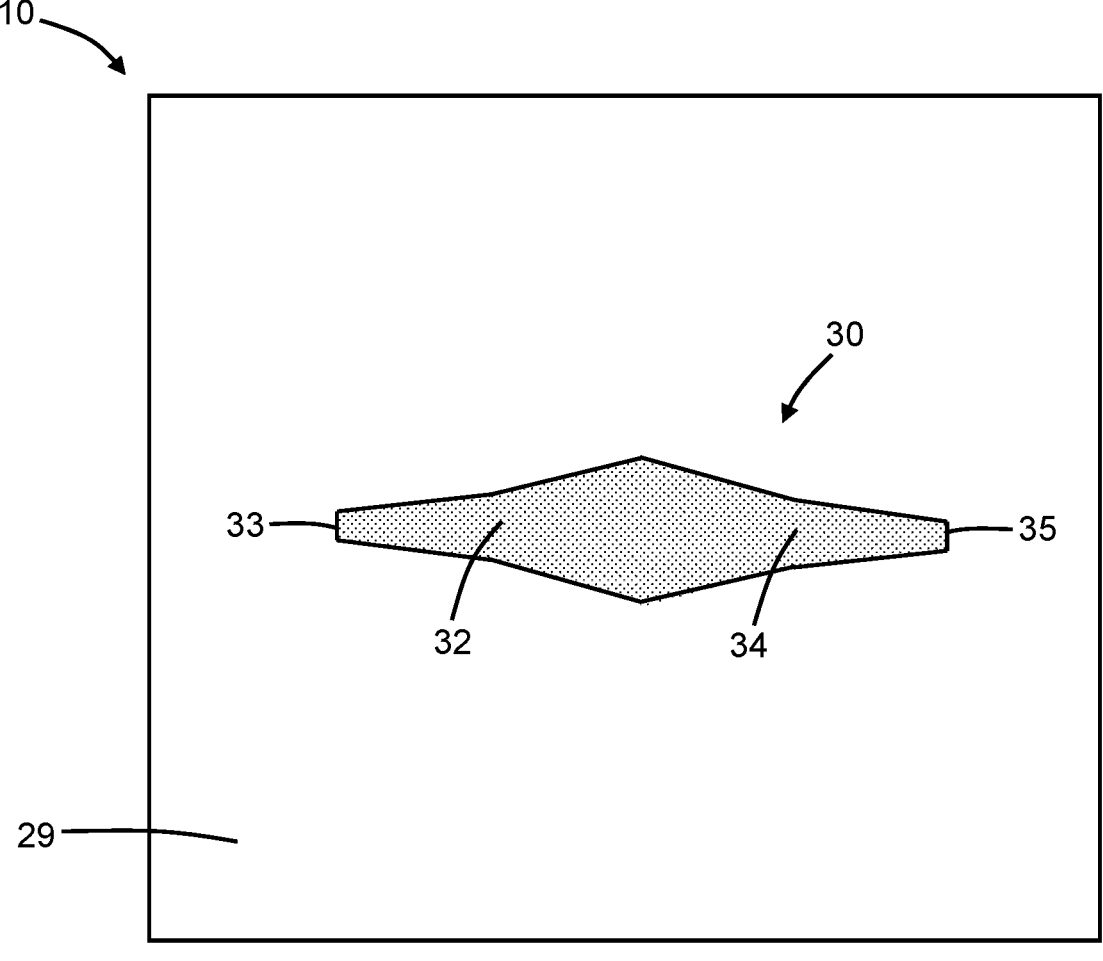
FIG. 12 is a top view of a structure in accordance with alternative embodiments of the invention.

With reference to FIG. 12 and in accordance with alternative embodiments, the tapered section 32 of the waveguide core 30 may taper in multiple stages each having a different taper angle and the tapered section 34 of the waveguide core 30 may taper in multiple stages each having a different taper angle. In the representative embodiment, the tapered section 32 and the tapered section 34 may taper in a pair of stages each having a different taper angle. The introduction of multiple stages for the tapering may improve the efficiency of the light transfer by altering the mode confinement.

Figure 13:
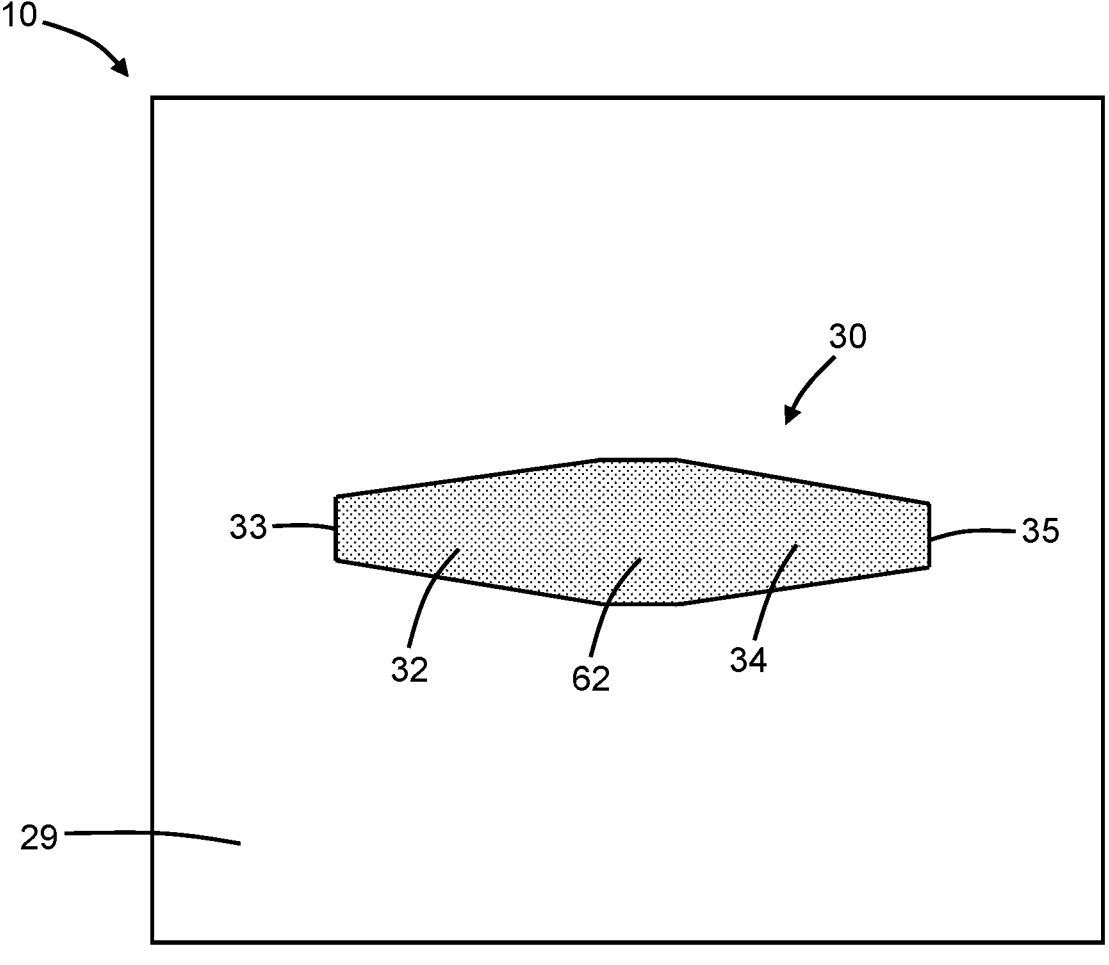
FIG. 13 is a top view of a structure in accordance with alternative embodiments of the invention.

With reference to FIG. 13 and in accordance with alternative embodiments, the tapered section 32 and the tapered section 34 of the waveguide core 30 may be joined by a central section 62 that is non-tapered. The central section 62 may be added to increase the separation between the waveguide core 30 and the waveguide core 50.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a first substrate;
a first waveguide core on the first substrate;
a second waveguide core;
a back-end-of-line stack including a third waveguide core disposed between the first waveguide core and the second waveguide core, the third waveguide core comprises a first layer stack that includes a first layer, a second layer, and a third layer between the first layer and the second layer, the first layer and the second layer comprising a first dielectric material with a first refractive index, and the third layer comprising a second dielectric material with a second refractive index that is less than the first refractive index; and
a fourth waveguide core on the first substrate,
wherein the back-end-of-line stack includes a fifth waveguide core that is disposed between the second waveguide core and the fourth waveguide core, the fifth waveguide core comprises a second layer stack that includes a first layer, a second layer, and a third layer between the first layer and the second layer, the first layer and the second layer of the second layer stack comprise the first dielectric material, and the third layer of the second layer stack comprises the second dielectric material.

2. The structure of claim 1 wherein the first layer and the second layer comprise nitrogen-doped silicon carbide or nitrogen-doped hydrogenated silicon carbide.

3. The structure of claim 1 wherein the first dielectric material of the first layer has a different composition than the second dielectric material of the second layer.

4. The structure of claim 1 wherein the second waveguide core includes a section that partially overlaps with the first layer stack.

5. The structure of claim 1 wherein the second waveguide core includes a section that fully overlaps with the first layer stack.

6. The structure of claim 1 wherein the first layer stack includes a fourth layer and a fifth layer between the second layer and the fourth layer, the fourth layer comprises the first dielectric material, and the fifth layer comprises the second dielectric material.

7. The structure of claim 1 wherein the back-end-of-line stack includes a dielectric layer, and the third waveguide core is embedded in the dielectric layer.

8. The structure of claim 7 wherein the dielectric layer comprises a third dielectric material having a different refractive index from the second dielectric material.

9. The structure of claim 8 wherein the third dielectric material has a different composition from the second dielectric material.

10. The structure of claim 7 wherein the dielectric layer comprises the second dielectric material.

11. The structure of claim 1 wherein the second waveguide core includes a first section that partially overlaps with the first layer stack and a second section that partially overlaps with the second layer stack.

12. The structure of claim 1 wherein the second waveguide core includes a first section that fully overlaps with the first layer stack and a second section that fully overlaps with the second layer stack.

13. The structure of claim 1 wherein the second waveguide core includes a first section that overlaps with the first layer stack and a second section that overlaps with the second layer stack, and further comprising:

a sixth waveguide core disposed in a gap between the first layer stack and the second layer stack,
wherein the second waveguide core includes a third section that connects the first section to the second section, and the third section of the second waveguide core bridges across the gap above the sixth waveguide core.

14. The structure of claim 13 wherein the sixth waveguide core is aligned orthogonal to the first waveguide core and the fourth waveguide core.

15. The structure of claim 1 further comprising:
a second substrate,
wherein the second waveguide core is disposed on the second substrate.

16. The structure of claim 15 further comprising:
a first dielectric layer; and
a second dielectric layer,
wherein the second substrate is bonded to the first substrate along a bonding interface between the first dielectric layer and the second dielectric layer.

17. The structure of claim 16 wherein the bonding interface is disposed between the first layer stack and the second waveguide core.

18. The structure of claim 1 wherein the second waveguide core comprises silicon nitride.

19. A structure comprising:
a substrate;
a first waveguide core on the substrate;
a second waveguide core; and
a back-end-of-line stack including a third waveguide core disposed between the first waveguide core and the second waveguide core, the third waveguide core comprises a first layer stack that includes a first layer, a second layer, and a third layer between the first layer and the second layer, the first layer and the second layer comprising a first dielectric material with a first refractive index, and the third layer comprising a second dielectric material with a second refractive index that is less than the first refractive index,
wherein the third waveguide core comprises a second layer stack that is laterally and vertically offset from the first layer stack, the second layer stack includes a first layer, a second layer, and a third layer between the first layer and the second layer, the first layer and the second layer of the second layer stack comprise the first dielectric material, and the third layer of the second layer stack comprises the second dielectric material.

20. A method comprising:
forming a first waveguide core on a substrate;
forming a second waveguide core;
forming a back-end-of-line stack that includes a third waveguide core disposed between the first waveguide core and the second waveguide core; and
forming a fourth waveguide core on the substrate,
wherein the third waveguide core comprises a layer stack that includes a first layer, a second layer, and a third layer between the first layer and the second layer, the first layer and the second layer comprise a first dielectric material with a first refractive index, the third layer comprises a second dielectric material with a second refractive index that is less than the first refractive index, the back-end-of-line stack includes a fifth waveguide core that is disposed between the second waveguide core and the fourth waveguide core, the fifth waveguide core comprises a second layer stack that includes a first layer, a second layer, and a third layer between the first layer and the second layer, the first layer and the second layer of the second layer stack comprise the first dielectric material, and the third layer of the second layer stack comprises the second dielectric material.

* * * * *